(12) United States Patent
Nishizawa et al.

(10) Patent No.: US 11,501,509 B2
(45) Date of Patent: Nov. 15, 2022

(54) MOLD TEMPERATURE ANOMALY SIGN DETECTION APPARATUS, MOLD TEMPERATURE ANOMALY SIGN DETECTION METHOD AND STORAGE MEDIUM

(71) Applicants: Kabushiki Kaisha Toshiba, Minato-ku (JP); Toshiba Digital Solutions Corporation, Kawasaki (JP)

(72) Inventors: Minoru Nishizawa, Itabashi (JP); Kimiko Morita, Koto (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 161 days.

(21) Appl. No.: 16/857,393

(22) Filed: Apr. 24, 2020

(65) Prior Publication Data
US 2020/0257916 A1    Aug. 13, 2020

Related U.S. Application Data

(63) Continuation of application No. PCT/JP2018/012544, filed on Mar. 27, 2018.

(30) Foreign Application Priority Data

Nov. 6, 2017 (JP) .............................. JP2017-213994

(51) Int. Cl.
*G06K 9/20* (2006.01)
*G06V 10/143* (2022.01)
(Continued)

(52) U.S. Cl.
CPC ......... *G06V 10/143* (2022.01); *G06K 9/6256* (2013.01); *G06N 3/08* (2013.01);
(Continued)

(58) Field of Classification Search
CPC ............... G06K 9/2018; G06K 9/6256; G06K 2209/19; G06K 9/00; G06K 9/6262;
(Continued)

(56) References Cited

U.S. PATENT DOCUMENTS 7,585,449 B2    9/2009  Nicol et al.
9,958,861 B2    5/2018  Kinoshita et al.
(Continued)

FOREIGN PATENT DOCUMENTS

CN    102147290 A    8/2011
CN    106980729 A    7/2017
(Continued)

OTHER PUBLICATIONS

European search opinion dated Jul. 16, 2021 (Year: 2021).*
(Continued)

*Primary Examiner* — Juan A Torres
(74) *Attorney, Agent, or Firm* — Maier & Maier, PLLC

(57) ABSTRACT

A mold temperature control system includes: an inference model generating portion configured to, based on a plurality of pieces of thermo image data of a mold acquired at predetermined intervals and pieces of teaching data associated with the plurality of pieces of thermo image data, learn a predetermined number of consecutive pieces of time-series image data extracted from the plurality of pieces of thermo image data as one piece of sample data to generate an inference model for detecting a sign of a temperature anomaly of the mold; a mold temperature anomaly degree inference portion configured to detect occurrence of the sign of the temperature anomaly of the mold the predetermined number ahead, using the inference model, based on the predetermined number of pieces of time-series image data of the mold; and a warning lamp request transmitting portion configured to control lighting-up of a warning lamp.

10 Claims, 17 Drawing Sheets

(51) Int. Cl.
  *G06K 9/62* (2022.01)
  *G06N 3/08* (2006.01)
  *G06N 5/04* (2006.01)
  *G08B 5/36* (2006.01)
  *H04L 67/12* (2022.01)
  *G08B 29/18* (2006.01)

(52) U.S. Cl.
  CPC ................. *G06N 5/04* (2013.01); *G08B 5/36* (2013.01); *H04L 67/12* (2013.01); *G06V 2201/06* (2022.01); *G08B 29/186* (2013.01)

(58) Field of Classification Search
  CPC .......... G06N 3/08; G06N 5/04; G06N 3/0454; G06N 3/084; G06N 3/04; G08B 5/36; G08B 29/186; H04L 67/12; B22D 17/10; B22D 17/2218; B22D 17/32; B22D 46/00; G06T 2207/10048; G06T 2207/20084; G06T 7/0004; B29C 45/78; B29C 45/73
  USPC ........................................................ 382/141
  See application file for complete search history.

(56) References Cited

U.S. PATENT DOCUMENTS

| | | | |
|---|---|---|---|
| 2012/0041575 A1* | 2/2012 | Maeda .................. | G05B 23/024 700/80 |
| 2014/0195184 A1* | 7/2014 | Maeda ................... | G05B 21/02 702/85 |
| 2018/0218487 A1* | 8/2018 | Mitarai ................... | G06F 17/16 |

FOREIGN PATENT DOCUMENTS

| | | |
|---|---|---|
| CN | 107067026 A | 8/2017 |
| JP | 08-267528 A | 10/1996 |
| JP | 2718800 B2 | 2/1998 |
| JP | 3083757 B2 | 9/2000 |
| JP | 2008-040647 A | 2/2008 |
| JP | 5637287 B2 | 12/2014 |
| JP | 5800289 B2 | 10/2015 |
| JP | 5895672 B2 | 3/2016 |
| JP | 6059375 B1 | 1/2017 |

OTHER PUBLICATIONS

Takehiko Tanaka et al., "Trouble Forecasting System by Multi-Neural Network on Continuous Casting Process of Steel Production", Proceedings of the International Conference on Artificial Neural Networks, XP002004430,1991, pp. 835-840.
Yu Liu et al., "Computer Vision Detection of Mold Breakout In Slab Continuous Casting Using an Optimized Neural Network", The International Journal of Advanced Manufacturing Technology, Springer, London, vol. 88, No. 1, Apr. 26, 2016, pp. 557-564.
Nagorny Pierre et al., "Quality Prediction in Injection Molding", 2017 IEEE, Jun. 27, 2017, pp. 141-146.
Matthew D. Zeller et al., "Visualizing and Understanding Convolutional Networks", arXiv:1311.2901v3 [cs. CV], Nov. 28, 2013, 11 pages.
International Search Report dated Jun. 12, 2018 in PCT/JP2018/012544 filed on Mar. 27, 2018, 2 pages.
Lecun et al., "Backpropagation Applied to Handwritten Zip Code Recognition", Neural Computation, vol. 1, 1989, pp. 541-551.
Rumelhart et al., "Learning representations by back-propagating errors", Nature vol. 323 (6088), Oct. 1986, pp. 533-536.

* cited by examiner

FIG. 4

| PHOTOGRAPHING DATE AND TIME | PRODUCT ID | DIE-CASTING MACHINE ID | THERMO IMAGE ID | THERMO IMAGE DATA |
|---|---|---|---|---|
| 2017.10.10 11:00 | Product01 | Machine02 | Image001 | IMAGE DATA IN BINARY DATA FORMAT |
| 2017.10.10 11:01 | Product01 | Machine02 | Image002 | IMAGE DATA IN BINARY DATA FORMAT |
| ... | | | | |
| 2017.10.10 16:59 | Product01 | Machine02 | Image003 | IMAGE DATA IN BINARY DATA FORMAT |

| INFERENCE MODEL ID | PRODUCT ID | DIE-CASTING MACHINE ID | THERMO IMAGE LIST | INFERENCE MODEL DATA |
|---|---|---|---|---|
| Model001 | Product01 | Machine02 | Image001~Image100 | MODEL PARAMETER SET IN MATRIX FORMAT |
| Model002 | Product02 | Machine01 | Image101~Image200 | MODEL PARAMETER SET IN MATRIX FORMAT |
| ... | ... | ... | ... | ... |
| Model099 | Product05 | Machine02 | Image201~Image300 | MODEL PARAMETER SET IN MATRIX FORMAT |

| PRECEDING JUDGMENT ID | CURRENT JUDGMENT ID | MACHINE CONTROL |
|---|---|---|
| JudgeRule01 | JudgeRule01 | CONTINUE OPERATION |
| JudgeRule01 | JudgeRule02 or JudgeRule03 | STOP OPERATION |
| JudgeRule02 or JudgeRule03 | JudgeRule01 | RESTART OPERATION |
| JudgeRule02 or JudgeRule03 | JudgeRule02 or JudgeRule03 | STOP OPERATION |

FIG. 14

| PHOTOGRAPHING DATE AND TIME | PRODUCT ID | DIE-CASTING MACHINE ID | THERMO IMAGE ID | THERMO IMAGE DATA |
|---|---|---|---|---|
| 2017.10.10 11:00 | Product01 | Machine02 | Image001 | IMAGE DATA IN BINARY DATA FORMAT |
| 2017.10.10 11:01 | Product01 | Machine02 | Image002 | IMAGE DATA IN BINARY DATA FORMAT |
| ... | | | | |
| 2017.10.10 16:59 | Product01 | Machine02 | Image003 | IMAGE DATA IN BINARY DATA FORMAT |

|  | $\dfrac{\partial}{\partial x_1}$ | $\dfrac{\partial}{\partial x_2}$ | $\cdots$ | $\dfrac{\partial}{\partial x_n}$ |
|---|---|---|---|---|
| GRADIENT VECTOR AT TIME OF K-TH CASTING | 0.45 | 0.12 | $\cdots$ | 0.81 |
| GRADIENT VECTOR AT TIME OF (K+1)TH CASTING | 0.18 | 0.29 | $\cdots$ | 0.03 |
| GRADIENT VECTOR AT TIME OF (K+2)TH CASTING | 0.23 | 0.32 | $\cdots$ | 0.52 |
| $\vdots$ | $\vdots$ | $\vdots$ | $\ddots$ | $\vdots$ |
| GRADIENT VECTOR AT TIME OF (K+L)TH CASTING | $-0.81$ | $-0.50$ | $\cdots$ | $-0.37$ |

MOLD TEMPERATURE ANOMALY SIGN DETECTION APPARATUS, MOLD TEMPERATURE ANOMALY SIGN DETECTION METHOD AND STORAGE MEDIUM

CROSS REFERENCE TO RELATED APPLICATION

This application is a continuation application of PCT/JP2018/012544 filed on Mar. 27, 2018 and claims benefit of Japanese Application No. 2017-213994 filed in Japan on Nov. 6, 2017, the entire contents of which are incorporated herein by this reference.

FIELD

An embodiment described herein relate to a mold temperature anomaly sign detection apparatus that detects a sign of a temperature anomaly of a mold used for a die-casting machine, an injection molding machine and the like, a mold temperature anomaly sign detection method and a storage medium.

BACKGROUND

Conventionally, manufacturing of metal parts, resin parts or the like using a mold has been performed.

For example, casting by a die-casting machine includes a casting process of pouring molten metal such as molten aluminum into a mold, solidifying the molten aluminum, and extracting a cast product. Defects of cast parts include poor running and casting cavities, and the defects may account for 70% of all defects. Since both of the poor running and the casting cavities are defects due to a mold temperature anomaly, a mold temperature is treated as an important quality management item in a die-casting site.

Mold temperature control may be performed by detecting a temperature of a mold using a temperature sensor like a thermocouple and controlling a mold heater based on the detected temperature. However, a thermocouple can detect only a temperature at a fixed point.

Therefore, if, for example, a mold lubricant is unevenly sprayed, a cooling effect by the spray of the mold lubricant also becomes uneven. Even if a heat pool occurs, only fixed-point measurement can be performed by a thermocouple. Furthermore, since a heat pool spot does not always occur at the same place, a heat pool spot may not be detected. Thus, poor running or casting cavities may occur.

Therefore, by introducing thermography capable of measuring the whole surface of a mold, an expert at a manufacturing site analyzing a heat pool sign occurrence mechanism from a thermography image, and adjusting a direction and amount of spray of a mold lubricant based on a sign of a heat pool, mold temperature control is performed so that a mold temperature anomaly does not occur.

However, since thermography image analysis by an expert is a method depending on individuals, it cannot be widely applied to many factories or to many products.

BRIEF DESCRIPTION OF THE DRAWINGS

FIG. 4 is a diagram for illustrating a data structure of a thermo image data storing portion 21 according to the embodiment;

FIG. 7 is a diagram for illustrating a data structure of an inference model data storing portion 51 according to the embodiment;

FIG. 11 is a diagram showing a data structure of a machine control rule storing portion 52 according to the embodiment;

FIG. 14 is a diagram showing a data structure of a thermo image data temporary storing portion 61a according to the embodiment;

DETAILED DESCRIPTION

A mold temperature anomaly sign detection apparatus of an embodiment includes: a model generating portion configured to, based on a plurality of pieces of thermo image data of a mold acquired at predetermined intervals and pieces of teaching data associated with the plurality of pieces of thermo image data, learn a predetermined number of consecutive pieces of time-series image data extracted from the plurality of pieces of thermo image data, as one piece of sample data to generate an inference model for detecting a sign of a temperature anomaly of the mold; an inference executing portion configured to detect occurrence of the sign of the temperature anomaly of the mold the predetermined number ahead, using the inference model, based on the predetermined number of pieces of time-series image data of the mold; and an information outputting portion configured to output predetermined information when the inference executing portion detects the occurrence of the sign of the temperature anomaly of the mold.

An embodiment will be described below with reference to drawings.

(System Configuration)

Figure 1:
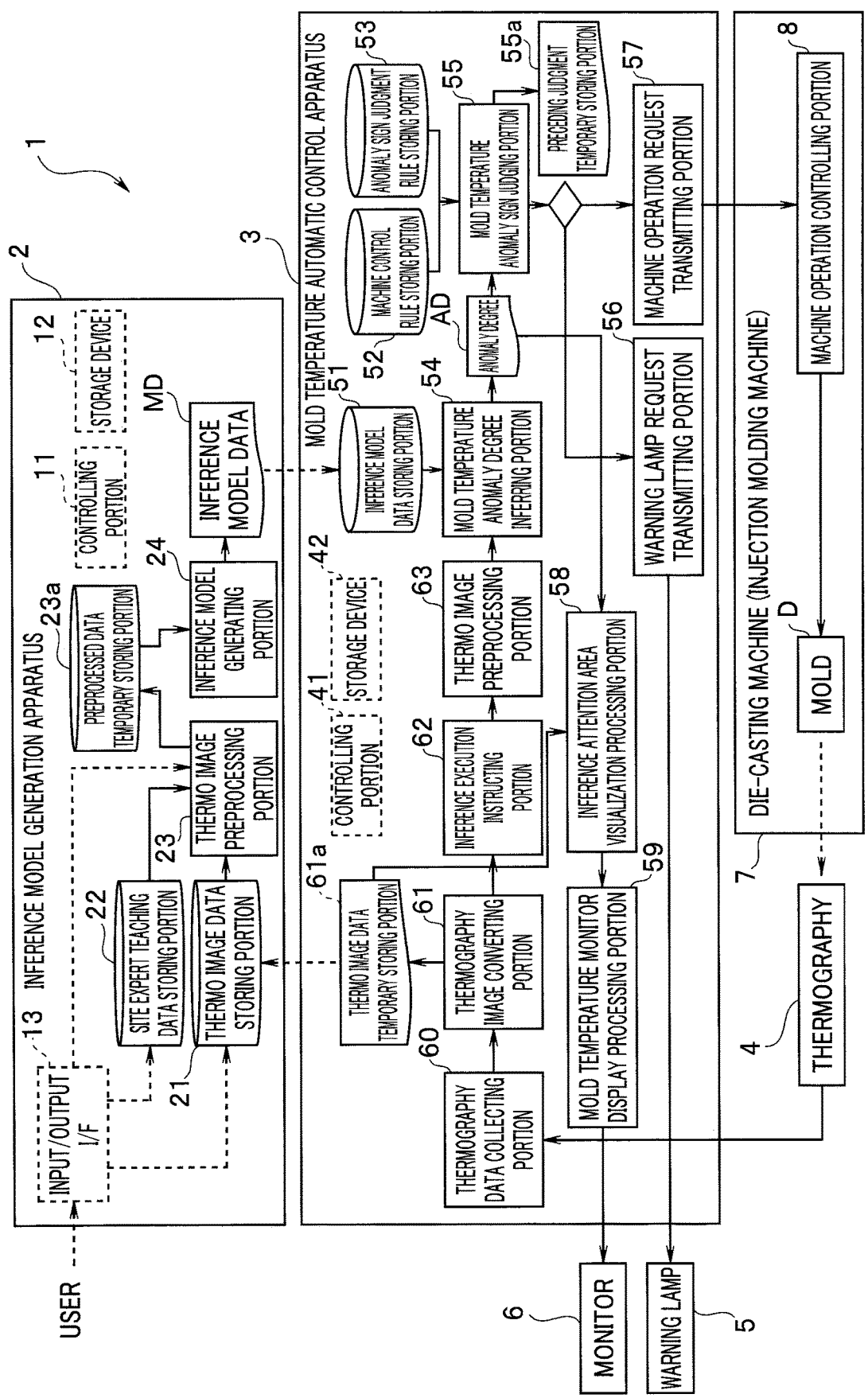
FIG. 1 is a configuration diagram of a mold temperature control system according to an embodiment.

FIG. 1 is a configuration diagram of a mold temperature control system according to the embodiment. A mold temperature control system 1 includes an inference model generation apparatus 2, a mold temperature automatic control apparatus 3, a thermography 4, a warning lamp 5 and a monitor 6 which is a display apparatus.

The mold temperature automatic control apparatus 3 outputs a control signal to a connected die-casting machine 7. Though one die-casting machine 7 connected to the mold temperature automatic control apparatus 3 is shown in FIG. 1, a plurality of die-casting machines may be connected to the mold temperature automatic control apparatus 3 so that the mold temperature automatic control apparatus 3 can control the plurality of die-casting machines.

The die-casting machine 7 includes a machine operation controlling portion 8 configured to control movement of a mold D. The mold temperature automatic control apparatus 3 outputs a control signal to the machine operation controlling portion 8 of the die-casting machine 7.

The thermography 4 is installed to pick up an image of a predetermined area of the mold D. When there are a plurality of die-casting machines, the thermography 4 is installed for each of the die-casting machines. As described later, among thermography data outputted by the thermography 4, a thermo image obtained at a predetermined timing in each shot where a die-cast product is created is used in an inference process after the inference model generation apparatus 2 and an inference execution instructing portion 62 of the mold temperature automatic control apparatus 3.

The inference model generation apparatus 2 generates an inference model about the mold D of the die-casting machine, and the mold temperature automatic control apparatus 3 performs detection of a sign of a temperature anomaly of the mold D, automatic control of the die-casting machine 7 and the like based on the generated inference model. Therefore, the inference model generation apparatus 2 and the mold temperature automatic control apparatus 3 constitute a mold temperature anomaly sign detection apparatus.

Figure 2:
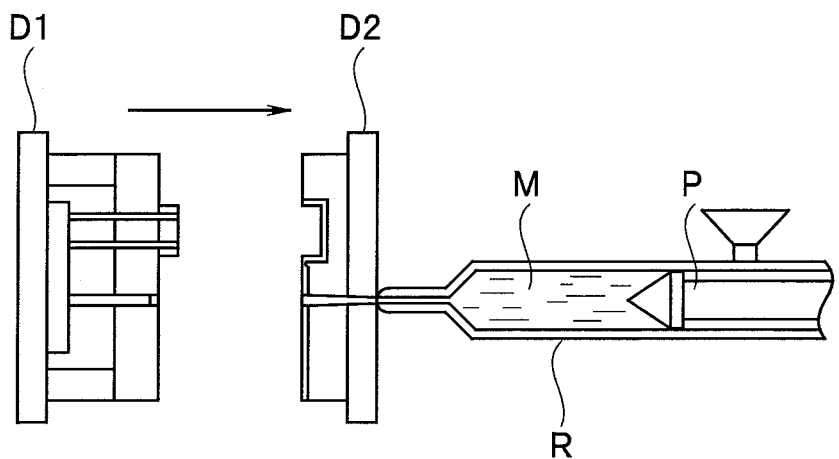
FIG. 2 is a schematic diagram for illustrating an injection system for molten metal such as aluminum into a mold cavity of a die-casting machine 7 according to the embodiment.

FIG. 2 is a schematic diagram for illustrating an injection system for molten metal such as aluminum into a mold cavity of the die-casting machine 7.

One of a mold D1 between two molds D1 and D2 moves in a direction indicated by an arrow A for each shot, is brought into contact with the mold D2 and mold-closed. While the molds D1 and D2 are brought into contact with each other, molten metal M in a runner R is injected and charged into a mold cavity in the two molds D1 and D2 by movement of a plunger P.

After that, after the molten metal M in the mold cavity is pressure-held and cooled, the mold D1 moves in a direction opposite to the direction indicated by the arrow A, and the two molds D1 and D2 are mold-opened, and a molded cast product is taken out.

Further, while the cast product is manufactured, a mold lubricant is sprayed so that the cast product is easily pulled out from the molds. Note that, in the case of a mold with a complicated structure, the mold lubricant is not evenly sprayed, and a minute high-temperature spot occurs on an inside surface of the mold if the uneven spray of the mold lubricant continues. The minute high-temperature spot becomes a large heat pool soon, and poor running and casting cavity defects occur.

The thermography 4 picks up an image of the molds such that an inside surface on a mold cavity side of one of the molds D1 and D2. As described later, an image of the thermography 4 is collected at a certain timing for each shot.

Figure 3:
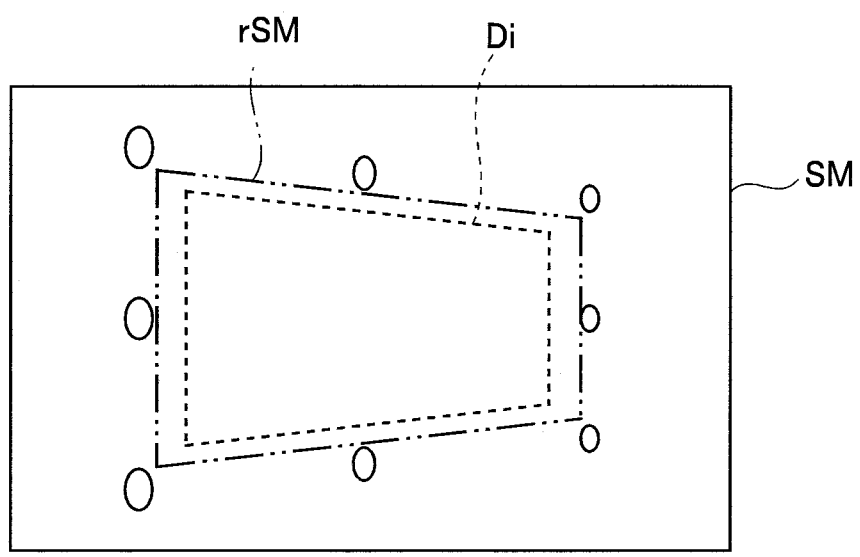
FIG. 3 is a diagram showing an example of a thermo image according to the embodiment.

FIG. 3 is a diagram showing an example of a thermo image. FIG. 3 is a schematic diagram showing an example of an image obtained by being picked up by the thermography 4, the image including an inside surface of a mold. A state of heat distribution is not shown here. Since the thermography 4 picks up an image of the inside surface of the mold in an oblique direction, a rectangular mold cavity is represented by a trapezoid. In an image SM of the thermography 4, an area Di on the cavity inside surface is indicated by a dotted line. A cutout area rSM of the image is indicated by a two-dot chain line.

An area including the area Di on the cavity inside surface is cut out from the image SM of the thermography 4 obtained for each shot, and an image of the cutout area rSM is used for model generation, an inference process and the like to be described later.

It is for the purpose of improving accuracy of model generation, and the like to use the image of the cutout area rSM for the model generation. However, the whole image SM of the thermography 4 may be used for the model generation, the inference process and the like.

Though there is one thermography 4, which picks up an image of a mold cavity inside surface of one of two molds in an example below, two or more thermographies 4 may be provided so that images of mold cavity inside surfaces of both of the two molds may be picked up for each shot.

Next, returning to FIG. 1, a configuration of the inference model generation apparatus 2 will be described.

(Configuration of Inference Model Generation Apparatus)

The inference model generation apparatus 2 is a computer that includes hardware circuits such as a controlling portion 11 (indicated by a dotted line) that is a processor including a central processing unit (hereinafter referred to as a CPU), a ROM, a RAM and the like, a storage device 12 (indicated by a dotted line) including a flash memory, a hard disk drive device and the like, and input/output interfaces (hereinafter referred to as an input/output I/F) 13 (indicated by a dotted line) such as a keyboard, a monitor, a mouse and data input/output interfaces.

The inference model generation apparatus 2 further has a thermo image data storing portion 21, a site expert teaching data storing portion 22, a thermo image preprocessing portion 23, a preprocessed data temporary storing portion 23a and an inference model generating portion 24.

The thermo image data storing portion 21, the site expert teaching data storing portion 22 and the preprocessed data temporary storing portion 23a are storage areas storing data and are included in the storage device 12.

The thermo image preprocessing portion 23 and the inference model generating portion 24 are software programs, which are recorded in the storage device 12, and read out and executed by the CPU of the controlling portion 11.

The thermo image data storing portion 21 is a storing portion configured to store a thermo image data set specified and registered by a user.

FIG. 4 is a diagram for illustrating a data structure of the thermo image data storing portion 21.

As shown in FIG. 4, the thermo image data storing portion 21 is a database configured including, for each thermo image, a photographing date and time, a product ID which is an identifier (hereinafter abbreviated as an ID) of a product, a die-casting machine ID which is an ID of a die-casting machine in which a photographing target mold is incorporated, a thermo image ID which is an ID of the thermo image, and thermo image data.

The thermo image data set is an aggregate of images obtained by photographing the mold when casting is actually performed by the die-casting machine, using the thermography 4. Among the thermo images registered with the thermo image data storing portion 21, photographed images when casting quality of a manufactured product is good and photographed images when the casting quality is bad are mixed.

The thermo image data is data in a file format such as JPEG or BMP and is a color image in the present embodiment.

A site expert operates the inference model generation apparatus 2 which is a computer to register a thermo image data set accumulated beforehand with the thermo image data storing portion 21.

The site expert teaching data storing portion 22 is a storing portion configured to store a teaching data set specified by the user. Pieces of teaching data associated with thermo images, that is, thermo images which are heat distribution images obtained by the thermography 4 are registered with the site expert teaching data storing portion 22.

Figure 5:
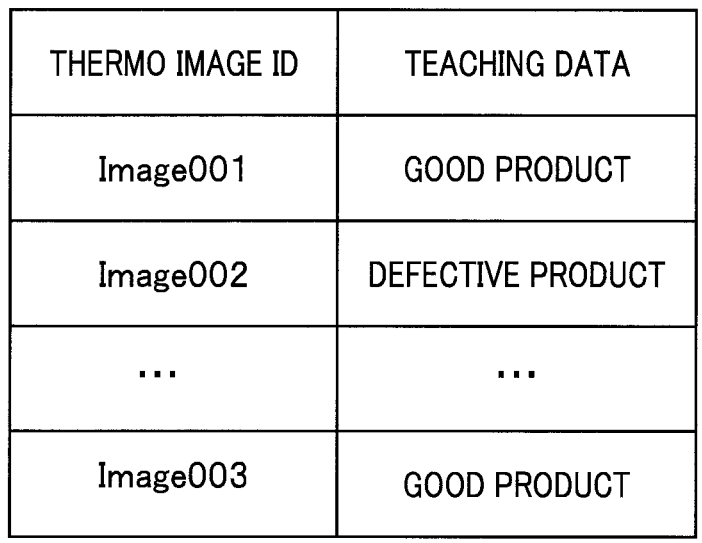
FIG. 5 is a diagram for illustrating a data structure of a site expert teaching data storing portion 22 according to the embodiment.

FIG. 5 is a diagram for illustrating a data structure of the site expert teaching data storing portion 22.

As shown in FIG. 5, the site expert teaching data storing portion 22 is configured including thermo image IDs and pieces of teaching data.

The teaching data is data set by a site expert judging quality of a cast product (whether a good product or a defective product). The teaching data is associated with thermo image data at the time of casting. The association between the teaching data and the thermo image data is performed by a thermo image ID.

As described above, a site expert operates the inference model generation apparatus 2 which is a computer to register a teaching data set beforehand with the site expert teaching data storing portion 22.

The thermo image preprocessing portion 23 acquires the thermo image data set of the thermo images included in the thermo image ID list, from the thermo image data storing portion 21.

The thermo image ID list is a list specified by the user when the user gives a model generation execution request to the inference model generation apparatus 2, and the thermo image ID list identifies thermo images used for generation of an inference model.

When the user gives the model generation execution request to the inference model generation apparatus 2, the controlling portion 11 executes the thermo image preprocessing portion 23 and, after that, executes the inference model generating portion 24.

The thermo image preprocessing portion 23 executes preprocessing, with the acquired thermo image data set as an input. In the preprocessing, a process for normalizing each pixel value of the thermo images so that the pixel value is within a range of 0 to 1 is performed in order to enhance efficiency of a model generation process to be described later.

In the preprocessing, a conversion process for converting all the thermo images from color images to monochrome images to create monochrome thermo image data is performed.

Further, in the preprocessing, an average value image data generation process for creating, from all the monochrome thermo image data, average image data obtained by, for each pixel, performing addition and performing division by 255 to determine an average value is performed. The created average image data is temporarily stored into a predetermined area of the storage device 12.

Then, in the preprocessing, a preprocessed data creation process for subtracting the created average image data from each monochrome thermo image to create preprocessed data is executed.

The thermo image preprocessing portion 23 registers all the created preprocessed data with the preprocessed data temporary storing portion 23a.

Figure 6:
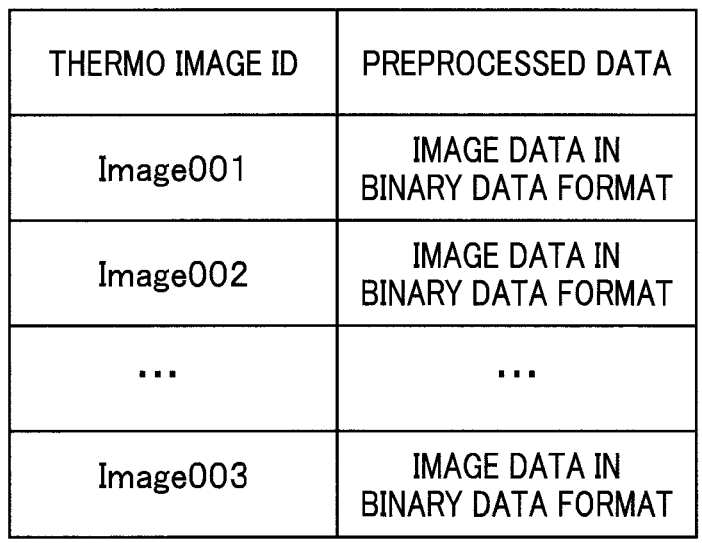
FIG. 6 is a diagram for illustrating a data structure of a preprocessed data temporary storing portion 23a according to the embodiment.

FIG. 6 is a diagram for illustrating a data structure of the preprocessed data temporary storing portion 23a.

As shown in FIG. 6, the preprocessed data temporary storing portion 23a is configured including thermo image IDs and pieces of preprocessed data.

The preprocessed data is data in a file format such as JPEG or BMP.

As described above, the thermo image preprocessing portion 23 performs the preprocessing only for a predetermined cutout area in a thermo image obtained by the thermography 4.

Since the thermography 4 picks up an image of the mold such that areas other than an attention area of the mold are included, only the cutout area rSM, which is the attention area, is cut out from a thermo image obtained in that manner, as shown in FIG. 3, and the preprocessing is performed for image data of the cut-out area. A mold anomaly temperature inference process to be described later is also performed for the cutout area rSM which is the same attention area. It is because inference accuracy may be improved by performing the preprocessing and the like only for the attention area.

Note that the preprocessing may be performed for the whole image SM as described above.

The inference model generating portion 24 is executed after execution of the thermo image preprocessing portion 23.

The inference model generating portion 24 performs a process for executing learning by deep learning for the preprocessed data stored in the preprocessed data temporary storing portion 23a to generate an inference model. The inference model generating portion 24 in the present embodiment creates, for each casting by the die-casting machine, a neural network type inference model in which a boundary plane by which a good product and a defective product are separated well, from a space where each pixel data of a thermo image showing temperatures of the mold is plotted.

Here, the inference model is a neural network type inference model configured with structure information about an input layer, a hidden layer and an output layer constituting a neural network, that is, structure information about the neural network, and parameter information such as various kinds of weights in the neural network.

A method for generating the neural network type inference model is performed by learning by deep learning. The learning by deep learning is a process of updating weights of the respective layers (ω1 ... ωN) to proper values little by little so that errors between inferred output data and teaching data (a correct answer) for input data is reduced to determine optimal weights (that is, an inference model).

For the neural network in the present embodiment, a CNN (convolution neural network) that is often used for image analysis is used because thermo image data is targeted. Note that, for the CNN, see a document "Backpropagation applied to handwritten zip code recognition" by Y. LeCun, B. Boser, J. S. Denker, D. Henderson, R. E. Howard, W. Hubbard, and L. D. Jackel, NeuralComputation, vol. 1, pp. 541-551, 1989."

In the present embodiment, a sign of an anomaly is detected from time-series changes in thermo images before a temperature of the mold in which a defect of a cast product occurs becomes anomalous. Therefore, in the case of desiring to detect a sign of a mold temperature anomaly at the time of casting performed N (N is a positive integer) times ahead of the current casting, an inference model is created, with thermo image data corresponding to "N" images as an input and with teaching data N times ahead as an output. Characteristics of the time-series changes in the thermo images are grasped by such an inference model.

For example, if a preprocessed thermo image is m×k (m indicates the number of vertical pixels of the image, and k indicates the number of horizontal pixels of the image), and N is 3, then one sample is pixel value data with the number of dimensions m×k×N.

The inference model of the present embodiment is created from a plurality of pieces of sample data. For example, the inference model is a model for, from immediately previous N consecutive past thermo images, inferring whether a cast product to be manufactured N shots ahead afterward is good or bad to output an anomaly degree showing a level of a sign of a temperature anomaly. The anomaly degree is indicated by a numerical value, which is a value within a range of 0.0 to 1.0 here, that is, the anomaly degree is outputted in a form of a probability. The anomaly degree shows that, the lower the value is, the more easily a good product is manufactured, and, the higher the value is, the higher the probability of a defective product being easily manufactured is.

In an inference process for calculating the anomaly degree, input data flows to the input layer, the hidden layer and the output layer of the inference model described above, and, lastly, a process of generating output data is executed. The probability indicating the anomaly degree is determined by a softmax function, with an output value from the last hidden layer as an input. Here, the softmax function is a scale defined between two probability distributions such as normal and anomalous.

Inference model data MD created by the inference model generating portion 24 is registered with an inference model data storing portion 51 of the mold temperature automatic control apparatus 3 as a data file in a predetermined format. If the inference model generation apparatus 2 and the mold temperature automatic control apparatus 3 are connected by a communication line, the inference model data is transmitted from the inference model generation apparatus 2 to the mold temperature automatic control apparatus 3 and registered with the inference model data storing portion 51. If the inference model generation apparatus 2 and the mold temperature automatic control apparatus 3 are not connected by a communication line, the inference model data MD is stored into a storage medium such as a memory card, and an administrator registers the data in the memory card with the inference model data storing portion 51.

As for the average image data created by the preprocessing portion, transmission or the like of the average image data together with the inference model data MD to the mold temperature automatic control apparatus 3 is performed, and the average image data is registered with a thermo image preprocessing portion 63.

The inference model data includes information required to calculate a value of each output node of an output layer of a neural network for an input given to an input layer. Here, the information required to calculate the value of each output node is a weight for each edge, a value of a bias, and other various kinds of parameters such as a parameter of an activation function.

FIG. 7 is a diagram for illustrating a data structure of the inference model data storing portion 51. FIG. 7 shows an example in which inference models for a plurality of inference models are registered with the inference model data storing portion 51, and each inference model is generated for each die-casting machine and for each product and is registered with the inference model data storing portion 51.

As shown in FIG. 7, the inference model data storing portion 51 is configured including inference model IDs, product IDs, die-casting machine IDs, thermo image lists and inference model data.

The inference mode ID is an ID for identifying an inference model.

The product ID is an ID for identifying a product (here, a cast product).

The die-casting machine ID is an ID for identifying a die-casting machine.

The thermo image list is list information about thermo image IDs used to generate an inference model.

The inference model data is a model parameter set in a matrix form, which identifies an inference model.

Next, an inference model generation process in the inference model generation apparatus 2 configured as described above will be described.

Figure 8:
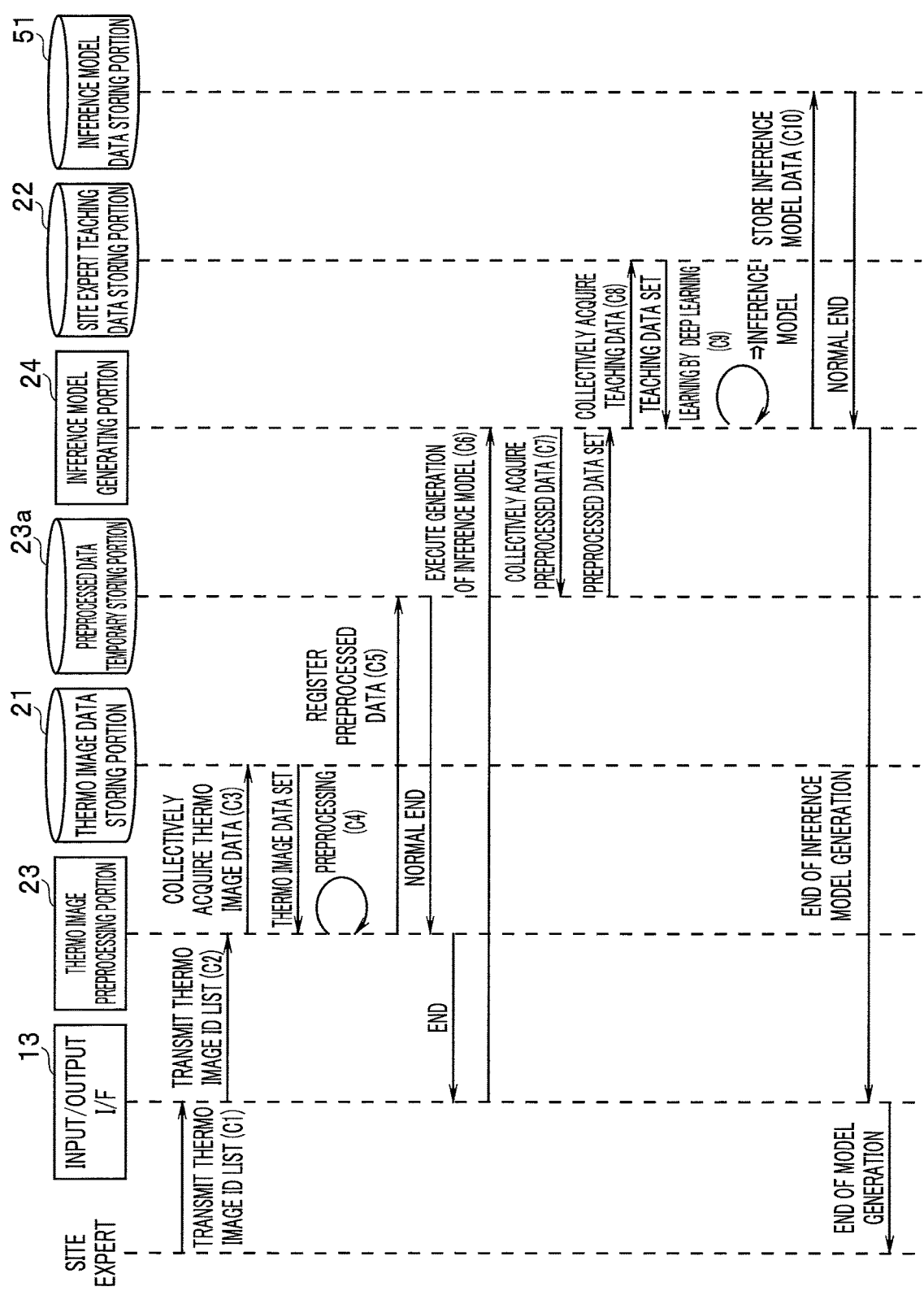
FIG. 8 is a sequence diagram of an inference model generation process according to the embodiment.

FIG. 8 is a sequence diagram of the inference model generation process.

First, the user performs transmission of a thermo image ID list to the inference model generation apparatus 2 (C1). In other words, the user who wants to create an inference model by the inference model generation apparatus 2 inputs or gives list information about thermo images used for generation of the inference model to the inference model generation apparatus 2 from the keyboard or the like of the inference model generation apparatus 2.

The input/output I/F 13 transmits the inputted thermo image ID list to the thermo image preprocessing portion 23 (C2).

The thermo image preprocessing portion 23 collectively acquires a thermo image data set shown in the thermo image ID list, from the thermo image data storing portion 21 (C3).

The thermo image preprocessing portion 23 executes the preprocessing described above, with the acquired thermo image data set as an input (C4).

The thermo image preprocessing portion 23 registers all the preprocessed data with the preprocessed data temporary storing portion 23a (C5).

The user requests the inference model generating portion 24 to execute generation of the inference model (C6).

The inference model generating portion 24 collectively acquires a preprocessed data set from the preprocessed data temporary storing portion 23a (C7).

The inference model generating portion 24 collectively acquires teaching data from the site expert teaching data storing portion 22 (C8).

Here, the preprocessed data is acquired not for each sample but collectively. The acquired preprocessed data and teaching data are associated by a thermo image ID.

The inference model generating portion 24 executes learning by deep learning and generates the inference model (C9). The input data to the inference model generating portion 24 is a pair of the preprocessed data and the teaching data, and the output data is inference model data MD.

A structure (the number of nodes of an input layer, the number of hidden layers, the number of nodes of an output layer, the number of nodes of each hidden layer and the like) of a neural network in the inference model is set by the user in advance.

Therefore, the inference model data MD is a set of parameter data such as a weight in the structure of the neural network.

Here, an inference model of the present embodiment will be described.

Figure 9:
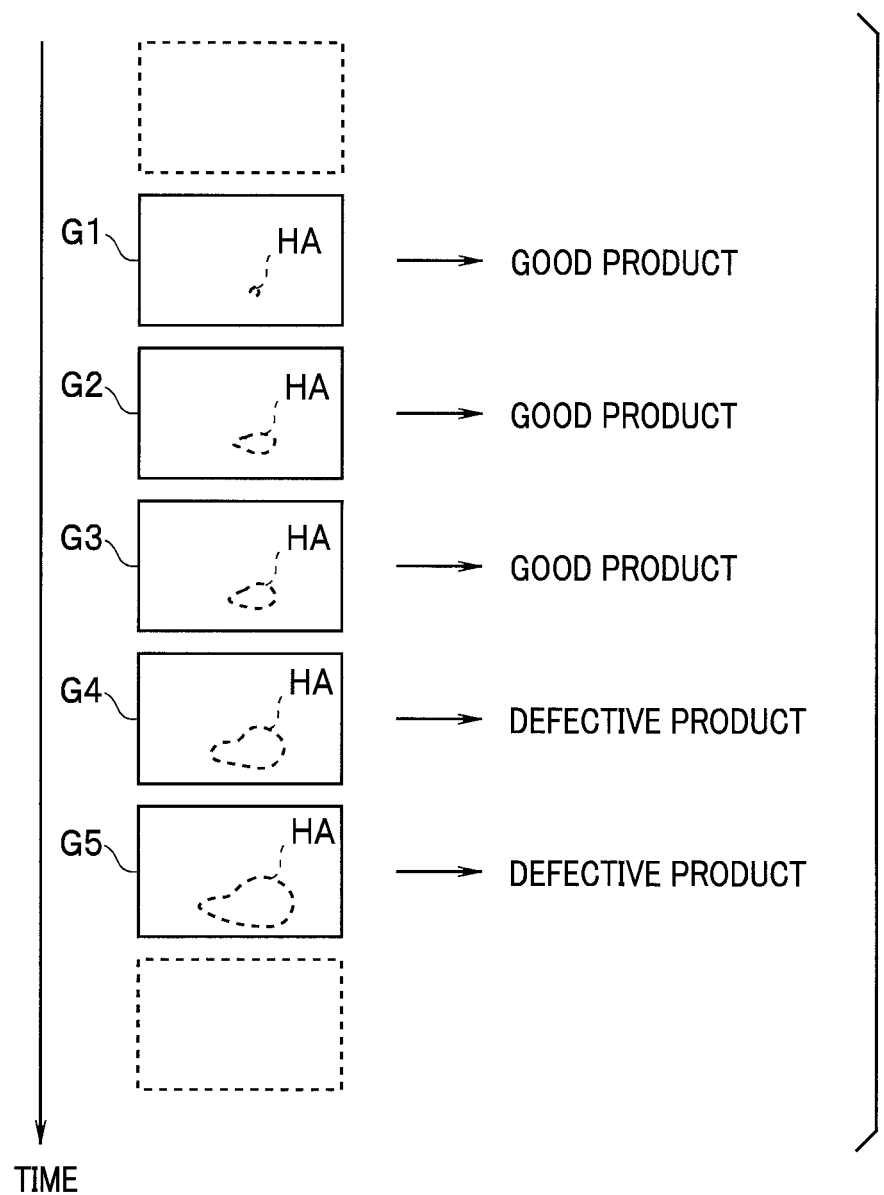
FIG. 9 is a diagram for illustrating a correspondence relationship between preprocessed data and teaching data according to the embodiment.

FIG. 9 is a diagram for illustrating a correspondence relationship between preprocessed data and teaching data.

In FIG. 9, images G of preprocessed data for each shot are obtained along a time series, and teaching data corresponding to the plurality of images G is given to the inference model generating portion 24.

In FIG. 9, when a product when an image G1 is obtained is a good product, and products when images G2 and G3 subsequent to the image G1 are obtained are also good products, but products when images G4 and G5 subsequent to the image G3 are obtained are defective products, it is possible to predict whether a product N shots ahead is good or bad, based on changes in areas HA with a predetermined or higher temperature in the images G.

When N is assumed to be 3, the inference model of the present embodiment is a model that predicts whether a product manufactured three shots ahead is good or bad from immediately previous three past images. Therefore, the inference model generating portion 24 generates inference model data that predicts whether a product N shots ahead is good or bad, with N preprocessed images as input data.

Figure 10:
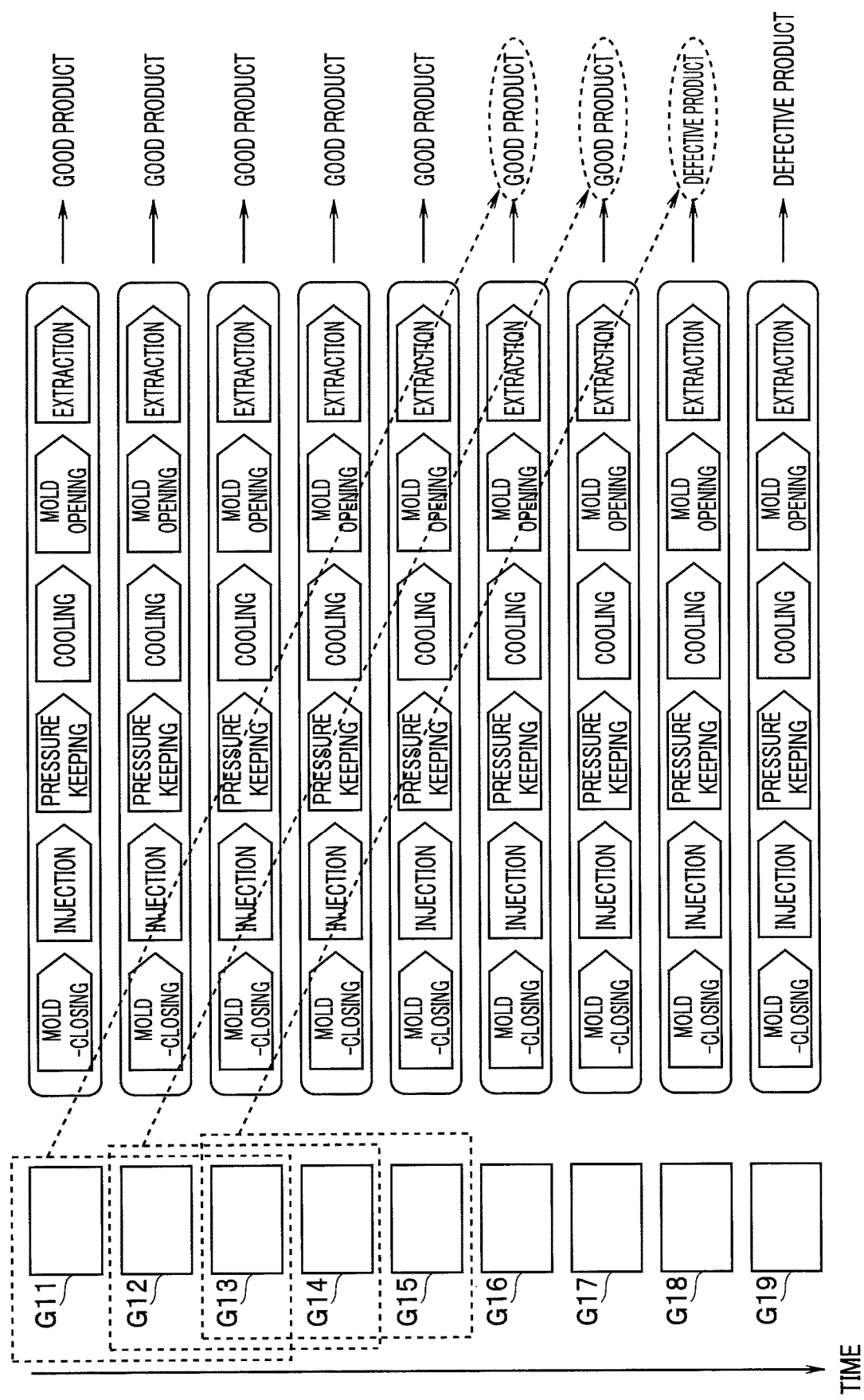
FIG. 10 is a diagram for illustrating an inference model for predicting whether a product N shots ahead is good or bad, with N preprocessed images as input data according to the embodiment.

FIG. 10 is a diagram for illustrating an inference model for predicting whether a product N shots ahead is good or bad, with N preprocessed images as input data.

In FIG. 10, after the image G11 which is a preprocessed image is obtained, the next shot, that is, mold-closing, injection, pressure keeping, cooling, mold opening and taking out are performed, and a product is manufactured.

Preprocessed data and teaching data are associated by a thermo image ID, and the inference model generating portion 24 generates inference model data MD that infers whether a product three shots ahead becomes a good product or a defective product, from preprocessed data corresponding to three consecutive shots, by learning based on teaching data (information indicating being a good product or a defective product) of a product created at each shot.

In the case of FIG. 10, for an input of the inference model with consecutive images G11, G12 and G13 as sample data, teaching data indicating that a product created when an image G16 is obtained is "a good product" corresponds to an output of the inference model. Similarly, for an input of the inference model with consecutive images G12, G13 and G14 as sample data, teaching data indicating that a product created when an image G17 is obtained is "a good product" corresponds to an output of the inference model. Similarly, for an input of the inference model with consecutive images G13, G14 and G15 as sample data, teaching data indicating that a product created when an image G18 is obtained is "a defective product" corresponds to an output of the inference model.

Respective pieces of thermo image data of the sample data are pieces of image data of the mold acquired at predetermined intervals. The inference model generating portion 24 generates an inference model for detecting a sign of a mold temperature anomaly based on a plurality of pieces of thermo image data and pieces of teaching data associated with the plurality of pieces of thermo image data. At this time, the inference model generating portion 24 performs learning, with a predetermined number (N) of consecutive pieces of time-series image data extracted from among the plurality of pieces of thermo image data as one piece of sample data.

In other words, the inference model generating portion 24 constitutes a model generating portion configured to learn a predetermined number (N) of consecutive pieces of time-series image data extracted from among a plurality of pieces of thermo image data as one piece of sample data, based on a plurality of pieces of thermo image data of the mold acquired at predetermined intervals and pieces of teaching data associated with the plurality of pieces of thermo image data, and generate an inference model for detecting a sign of a mold temperature anomaly.

As described above, a predetermined number of preprocessed images that are consecutive in time series are collectively given to the inference model generating portion 24 as one piece of sample data and used for generation of an inference model by deep learning.

As described above, the inference model generating portion 24 gives a plurality of pieces of sample data to a neural network of an inference model to calculate inference model data MD including a weighting factor of each node of each layer in the neural network and the like. Here, an inference model capable of inferring whether a product a plurality of images ahead becomes a good product or a defective product from a plurality of past images is generated based on thermo images of the mold.

As described above, the inference model generating portion 24 transmits the generated inference model data MD to the mold temperature automatic control apparatus 3, for example, via a communication line, to store the inference model data MD into the inference model data storing portion 51 (C10).

In the way as described above, the inference model is generated.

The inference model data MD stored into the inference model data storing portion 51 is set for a mold temperature anomaly degree inferring portion 54 to be described later by an administrator of the mold temperature automatic control apparatus 3.

(Configuration of Mold Temperature Automatic Control Apparatus)

Returning to FIG. 1, the mold temperature automatic control apparatus 3 is a computer that includes a controlling portion 41 (indicated by a dotted line) that is a processor including a CPU, a ROM, a RAM and the like, a storage device 42 (indicated by a dotted line) including a flash memory, a hard disk drive device and the like, and input/output I/F (not shown) such as a keyboard, a monitor, a mouse and a data input interface.

The mold temperature automatic control apparatus 3 has the inference model data storing portion 51, a machine control rule storing portion 52, an anomaly sign judgment rule storing portion 53, a mold temperature anomaly degree inferring portion 54, a mold temperature anomaly sign judging portion 55, a warning lamp request transmitting portion 56, a machine operation request transmitting portion 57, an inference attention area visualization processing portion 58, a mold temperature monitor display processing portion 59, a thermography data collecting portion 60, a thermography image converting portion 61, the inference execution instructing portion 62 and a thermo image preprocessing portion 63.

The inference model data storing portion 51, the machine control rule storing portion 52 and the anomaly sign judgment rule storing portion 53 are storage areas configured to store data and are included in the storage device 42.

The mold temperature anomaly degree inferring portion 54, the mold temperature anomaly sign judging portion 55, the warning lamp request transmitting portion 56, the machine operation request transmitting portion 57, the inference attention area visualization processing portion 58, the mold temperature monitor display processing portion 59, the thermography data collecting portion 60, the thermography image converting portion 61, the inference execution instructing portion 62 and the thermo image preprocessing portion 63 are software programs, which are recorded in the storage device 42, and read out and executed by the CPU of the controlling portion 41.

The inference model data storing portion 51 is a storing portion into which the inference model data MD described above is stored.

The machine control rule storing portion 52 is a storing portion in which machine control rules for controlling an operation of the die-casting machine 7 are stored. The machine control rules are configured with an aggregate of records, each of which is a combination of a preceding judgment ID, a current judgment ID and machine control. A data structure of the machine control rules will be described later.

FIG. 11 is a diagram showing a data structure of the machine control rule storing portion 52. The machine control rules are configured with an aggregate of records, each of which is a combination of a preceding judgment ID, a current judgment ID and machine control.

The anomaly sign judgment rule storing portion 53 is a storing portion configured to store anomaly sign judgment rules.

Figure 12:
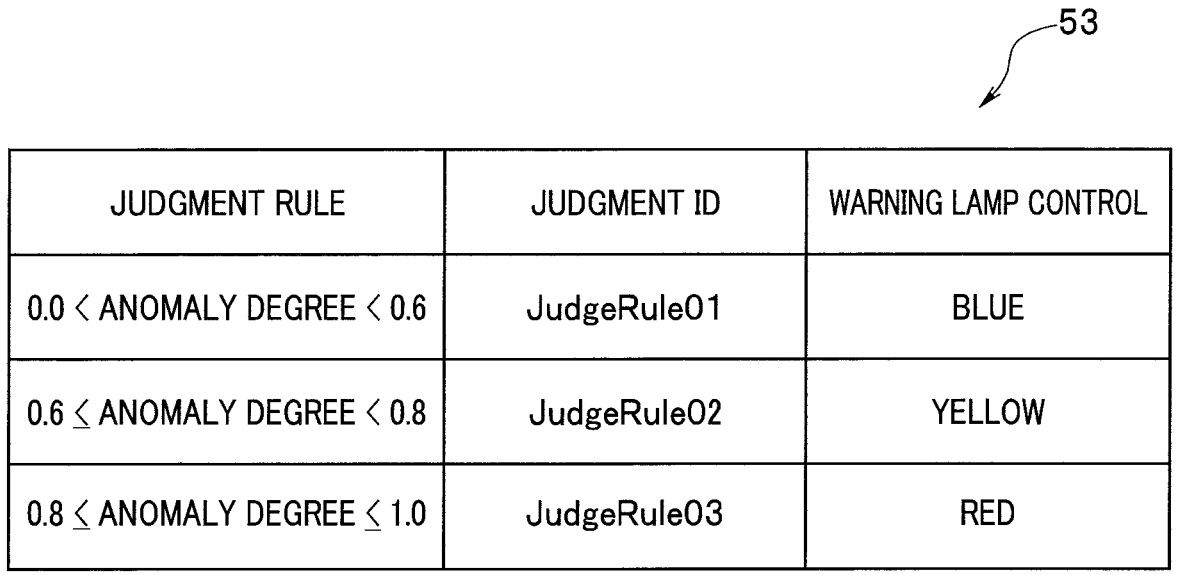
FIG. 12 is a diagram showing a data structure of an anomaly sign judgment rule storing portion 53 according to the embodiment.

FIG. 12 is a diagram showing a data structure of the anomaly sign judgment rule storing portion 53.

The anomaly sign judgment rules are configured with two or more records, each of which is a combination of a judgment rule, a judgment ID and warning lamp control. The number of records corresponds to the number of anomaly degree levels, and, in the present embodiment, three levels are defined. For example, "JudgeRule01", "JudgeRule02" and "JudgeRule03" have meanings of a normal level, a warning level and an error level, respectively. For each judgment rule, a range of an anomaly degree is defined. The warning lamp control defines a color in which the warning lamp lights up, for a matching judgment rule.

The mold temperature anomaly degree inferring portion 54 executes the above-described inference process for inferring an inference degree, based on an inference model. More specifically, the mold temperature anomaly degree inferring portion 54 executes an inference process for detecting occurrence of a sign of a mold temperature anomaly N shots ahead, with received preprocessed data corresponding to N images as input data, and outputs an anomaly degree which is a value within a range from 0.0 to 1.0.

The mold temperature anomaly degree inferring portion 54 transmits outputted anomaly degree data AD to the mold temperature anomaly sign judging portion 55.

The mold temperature anomaly sign judging portion 55 executes an anomaly sign judgment process based on the anomaly sign judgment rules and the anomaly degree.

Therefore, the mold temperature anomaly degree inferring portion 54 and the mold temperature anomaly sign judging portion 55 constitute an inference executing portion configured to detect occurrence of a sign of a mold temperature anomaly a predetermined number (N) of pieces of time-series image data ahead using an inference model, based on a predetermined number (N) of pieces of time-series image data of the mold.

The mold temperature anomaly sign judging portion 55 decides an operation instruction to the warning lamp 5 based on a judgment result, outputs the operation instruction to the warning lamp request transmitting portion 56 and outputs control information showing content of an operation of the die-casting machine 7 to the machine operation request transmitting portion 57.

The mold temperature anomaly sign judging portion 55 stores the judgment result into a preceding judgment temporary storing portion 55a. The preceding judgment temporary storing portion 55a may be a memory area of the storage device 42 or may be a predetermined register.

Figure 13:
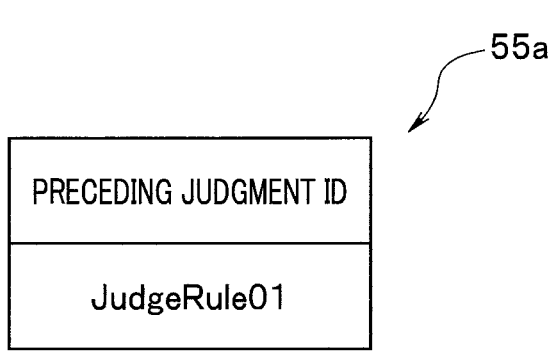
FIG. 13 is a diagram showing a data structure of a preceding judgment temporary storing portion 55a according to the embodiment.

FIG. 13 is a diagram showing a data structure of the preceding judgment temporary storing portion 55a. A preceding judgment ID can be stored into the preceding judgment temporary storing portion 55a.

Returning to FIG. 1, the warning lamp request transmitting portion 56 is a processing portion configured to transmit an operation request signal to the warning lamp 5.

The machine operation request transmitting portion 57 transmits the received machine control information to the machine operation controlling portion 8. For example, if the received machine control information indicates restart of operation, the machine operation controlling portion 8 of the die-casting machine 7 restarts operation of the die-casting machine 7 based on the received machine control information (restart of operation).

The inference attention area visualization processing portion 58 executes a process for visualizing gradient data about an attention area.

The process by the inference attention area visualization processing portion 58 will be described later.

The mold temperature monitor display processing portion 59 executes a process for generating an image to be displayed on the monitor 6 based on image data from the inference attention area visualization processing portion 58.

The thermography data collecting portion 60 is a processing portion configured to collect thermography images from thermography data outputted by the thermography 4. The thermography data collecting portion 60 acquires a thermography image at a predetermined timing based on an operation of the die-casting machine 7. The timing at which the thermography image is acquired is, for example, a timing a predetermined time period before a shot of the mold is started. Thermo image data used by the inference model generation apparatus 2 is data acquired at the same timing as the timing.

The thermography image converting portion 61 converts thermography data, which is numerical value data, to a color image to create thermo image data.

The thermography image converting portion 61 registers the thermo image data with a thermo image data temporary storing portion 61a.

FIG. 14 is a diagram showing a data structure of the thermo image data temporary storing portion 61a. The thermo image data temporary storing portion 61a includes photographing dates and time, product IDs, die-casting machine IDs, thermo image IDs and thermo image data. The data structure of the thermo image data temporary storing portion 61a is the same as the data structure of the thermo image data storing portion 21 of FIG. 4.

Note that the data stored into the thermo image data temporary storing portion 61a may be stored into the thermo image data storing portion 21 via a communication line or a manually via a storage medium as indicated by a dotted line in FIG. 1 so that the data can be used at the time of updating an inference model.

The thermography image converting portion 61 is a processing portion configured to transmit an inference execution request to the inference execution instructing portion 62 when image conversion of N thermo images ends. The inference execution request includes the N thermo images.

The inference execution instructing portion 62 transmits the N thermo images to the thermo image preprocessing portion 63 and instructs execution of inference.

The thermo image preprocessing portion 63 performs preprocessing for the received N thermo images. In the preprocessing, a normalization process is performed so that values are included within a range from 0 to 1 similarly to the thermo image preprocessing portion 23 of the inference model generation apparatus 2.

In other words, the thermo image preprocessing portion 63 converts all the thermo images from color images to monochrome images to create monochrome thermography image data.

The thermo image preprocessing portion 63 subtracts the created average image data from each monochrome thermo image to create preprocessed data.

Note that the average image data is data created at the time of generating an inference model and registered with the thermo image preprocessing portion beforehand.

The thermo image preprocessing portion 63 transmits the preprocessed data corresponding to the N images to the mold temperature anomaly degree inferring portion 54.

(Operation)

Next, an operation of the mold temperature automatic control apparatus 3 will be described.

1) Process from Collection of Thermography Data to Transmission of Inference Execution Request First, a process from collection of thermography data to transmission of an inference execution request will be described.

Figure 15:
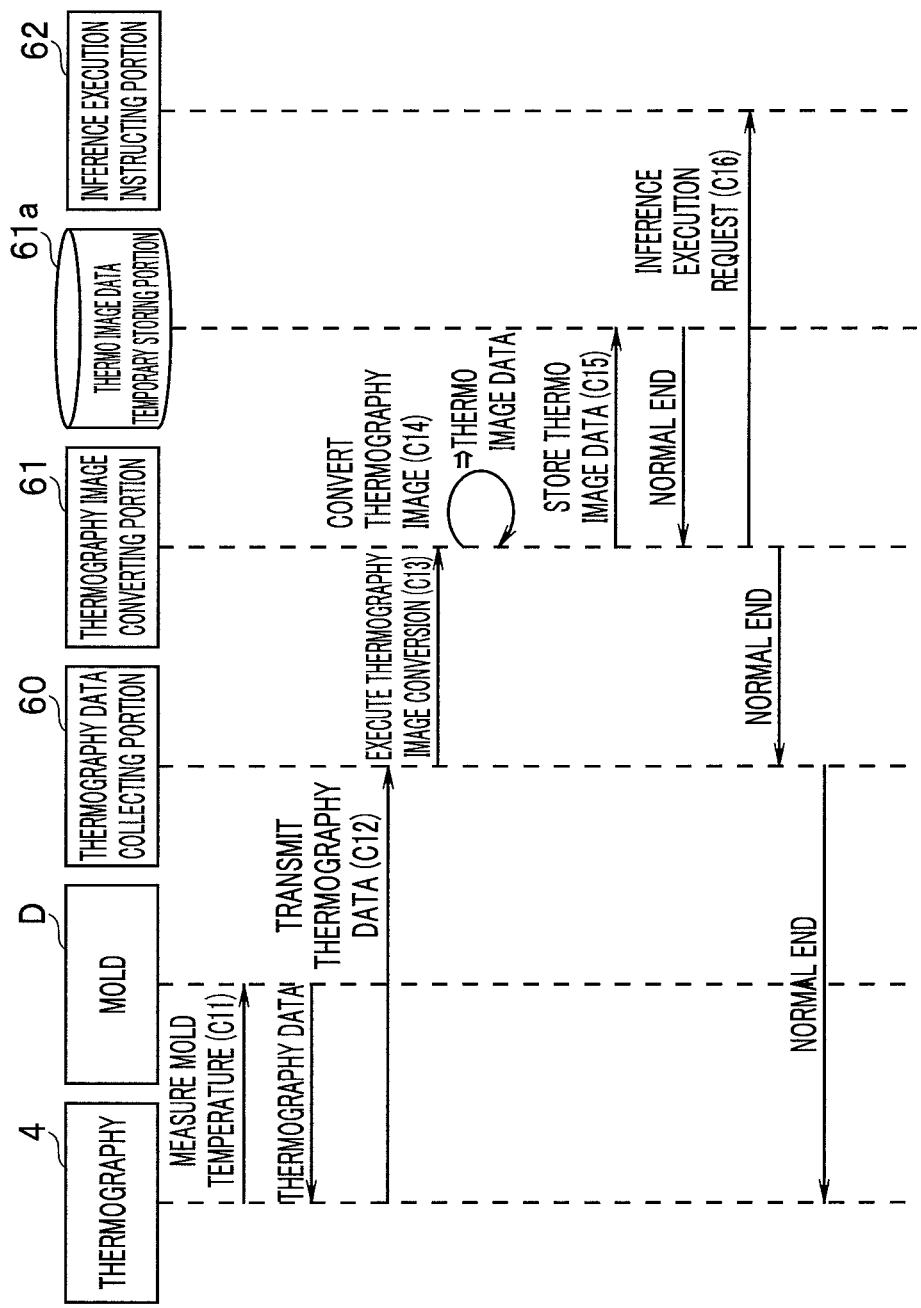
FIG. 15 is a sequence diagram of a process from collection of thermography data to transmission of an inference execution request according to the embodiment.

FIG. 15 is a sequence diagram of the process from collection of thermography data to transmission of an inference execution request. The process of FIG. 15 is executed while the die-casting machine 7 is operating.

The thermography 4 picks up an image of the mold D installed in the die-casting machine 7, measures a temperature of the mold D and outputs thermography data (C11). The thermography data is an aggregate of numerical value data of infrared rays radiated from the mold D.

The thermography 4 transmits the measured thermography data to the thermography data collecting portion 60 (C12).

The thermography data collecting portion 60 hands over the thermography data to the thermography image converting portion 61 and requests execution of image conversion (C13).

The thermography image converting portion 61 converts the thermography data, which is numerical value data, to a color image to create thermo image data (C14).

The thermography image converting portion 61 registers the thermo image data with a thermo image data temporary storing portion 61a (C15).

The thermography image converting portion 61 transmits an inference execution request to the inference execution instructing portion 62 when image conversion of N thermo images ends (C16). The inference execution request includes the N thermo images.

The process from C12 to C16 is repeatedly executed for each shot by the die-casting machine 7.

The above is a flow of the process from collection of thermography data to transmission of an inference execution request.

2) Process from Execution of Inference to Lighting-Up of Warning Lamp

Next, a process from execution of inference to lighting-up of the warning lamp will be described.

Figure 16:
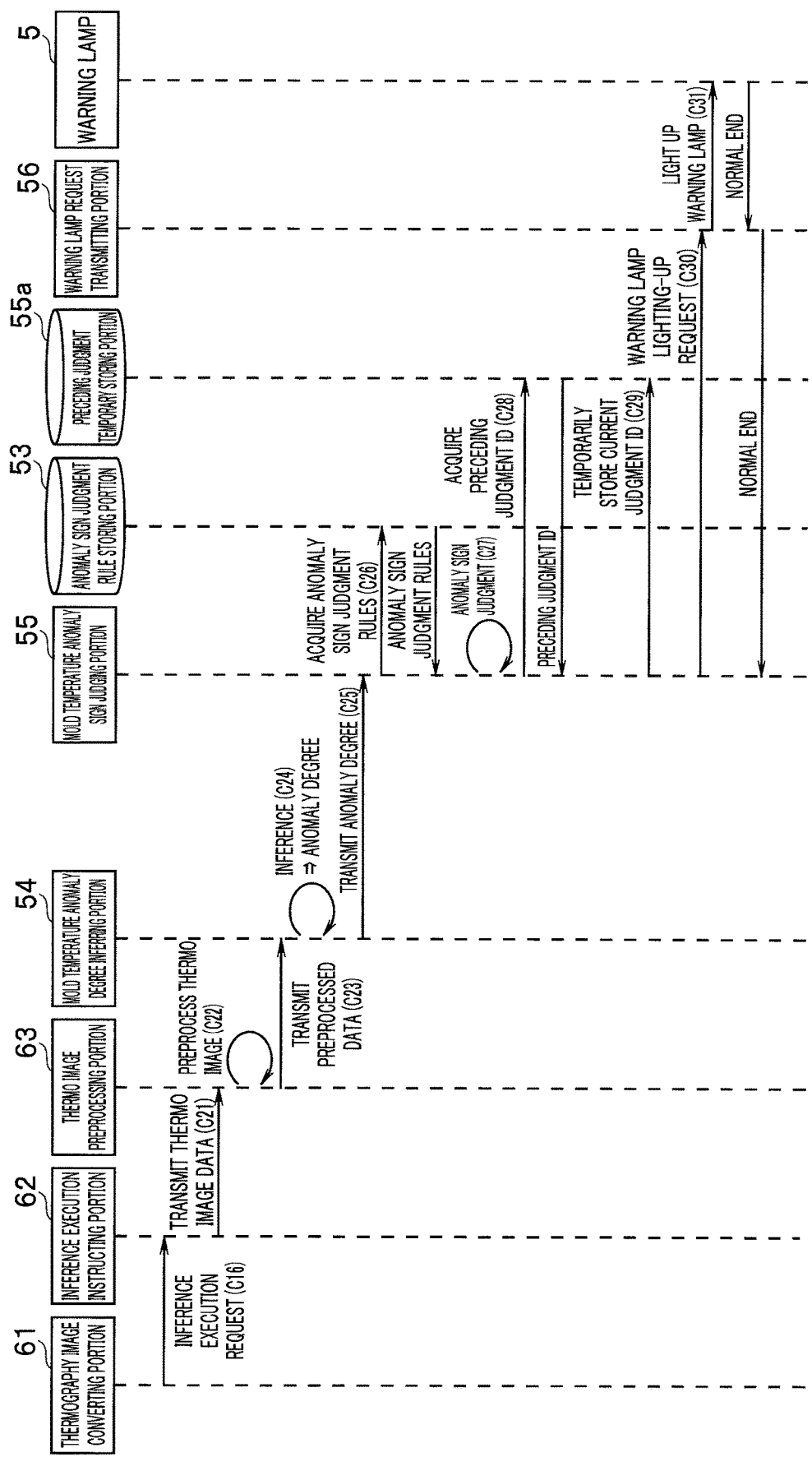
FIG. 16 is a sequence diagram of a process from execution of inference to lighting-up of a warning lamp according to the embodiment.

FIG. 16 is a sequence diagram of the process from execution of inference to lighting-up of the warning lamp.

As shown in FIG. 16, the inference execution instructing portion 62 transmits the N thermo images to the thermo image preprocessing portion 63 (C21).

The thermo image preprocessing portion 63 performs preprocessing for the received N thermo images (C22). In the preprocessing, the normalization process is performed so that values are included within a range from 0 to 1 similarly to the model generation process as described above.

The thermo image preprocessing portion 63 transmits the preprocessed data corresponding to the N images to the mold temperature anomaly degree inferring portion 54 (C23).

The mold temperature anomaly degree inferring portion 54 executes the inference process based on an inference model, with the received preprocessed data corresponding to the N images as an input (C24) and outputs an anomaly degree, a value within a range of 0.0 to 1.0. In other words, the mold temperature anomaly degree inferring portion 54 constituting the inference executing portion outputs anomaly degree data using an inference model, based on preprocessed data which is a predetermined number (N) of pieces of time-series images of the mold.

The mold temperature anomaly degree inferring portion 54 transmits the outputted anomaly degree to the mold temperature anomaly sign judging portion 55 (C25).

The mold temperature anomaly sign judging portion 55 acquires the anomaly sign judgment rules from the anomaly sign judgment rule storing portion 53 (FIG. 12) (C26).

The mold temperature anomaly sign judging portion 55 executes anomaly sign judgment based on the acquired anomaly sign judgment rules and the anomaly degree (C27). In other words, the mold temperature anomaly sign judging portion 55 constituting the inference executing portion detects occurrence of a sign of a mold temperature anomaly the predetermined number (N) of images ahead based on the anomaly degree.

For example, if the anomaly degree is 0.7, the judgment ID corresponds to "JudgeRule02" from the judgment rules of FIG. 12, and the judgment ID, "JudgeRule02" and the warning lamp control information, "yellow" are outputted. If the anomaly degree is 0.9, the judgment ID corresponds to "JudgeRule03" from the judgment rules of FIG. 12, and the judgment ID, "JudgeRule03" and the warning lamp control information, "red" are outputted.

The mold temperature anomaly sign judging portion 55 acquires a preceding judgment ID from the preceding judgment temporary storing portion 55a (C28). In the case of FIG. 13, since a judgment result at the time of the preceding casting is normal, "JudgeRule01" stored before detection of the sign is acquired. The acquired preceding judgment ID is used in a re-operation process of the die-casting machine 7 to be described later.

The mold temperature anomaly sign judging portion 55 temporarily stores the current judgment ID, "JudgeRule02" into the preceding judgment temporary storing portion 55a (C29).

The process from C21 to C29 above relates to the anomaly sign judgment.

The mold temperature anomaly sign judging portion 55 sends a warning lamp lighting-up request to the warning lamp request transmitting portion 56 to cause the warning lamp 5 to light up in a judged color (in the above example, yellow) (C30).

Receiving the warning lamp lighting-up request, the warning lamp request transmitting portion 56 outputs, in the above case, a lighting-up instruction to instruct the warning lamp 5 to light up in the predetermined color (C31).

Therefore, the warning lamp request transmitting portion 56 constitutes an information outputting portion configured to output predetermined information when occurrence of a sign of a mold temperature anomaly is detected.

The warning lamp 5 is a notifying portion configured to accept an instruction to light up in a color corresponding to an instruction and light up, in the above example, in yellow as a result. Indication by the warning lamp 5 notifies line operators and an administrator of a production line that there is a sign of occurrence of a mold temperature anomaly.

Therefore, the warning lamp 5 constitutes the notifying portion configured to notify the administrator and the like of occurrence of a sign of a temperature anomaly.

The process from C30 to C31 above relates to control of the warning lamp.

Next, description will be made on a process performed from when operation of the die-casting machine 7 is stopped after a sign of a mold temperature anomaly is detected until when the mold temperature decreases and recovers to a normal temperature afterward, and the die-casting machine 7 resumes operation.

Figure 17:
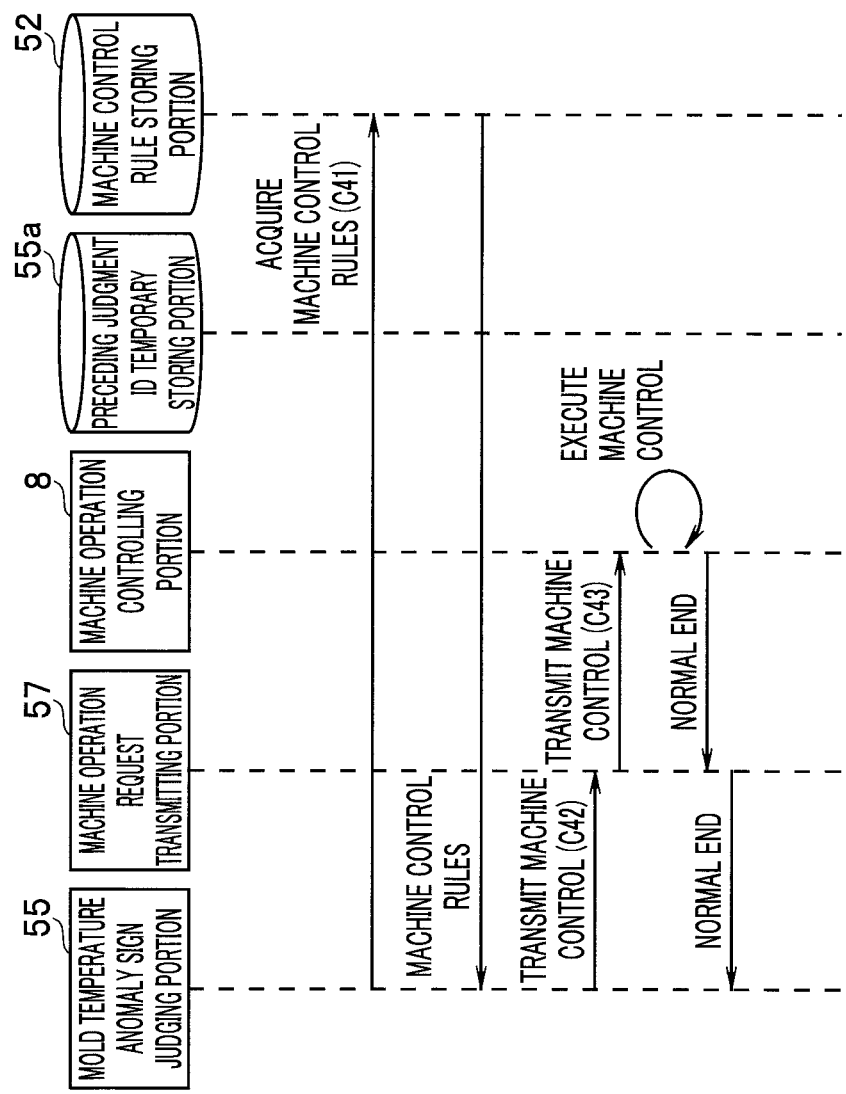
FIG. 17 is a sequence diagram of a process from judgment of a sign of a mold temperature anomaly to stop of operation of the die-casting machine according to the embodiment.

3) Process from Judgment of Sign of Mold Temperature Anomaly to Stop of Operation of Die-Casting Machine FIG. 17 is a sequence diagram of a process from judgment of a sign of a mold temperature anomaly to stop of operation of the die-casting machine.

The mold temperature anomaly sign judging portion 55 acquires the machine control rules from the machine control rule storing portion 52 (C41).

The mold temperature anomaly sign judging portion 55 selects a record of a matching rule based on the preceding judgment ID acquired at the sequence number C28 of FIG. 16 described above and a current judgment ID, and reads out the record. For example, if the preceding judgment ID is "JudgeRule01", and the current judgment ID is "JudgeRule02", the second record matches in FIG. 11. Then, machine control is performed, and "stop of operation" is selected. The mold temperature anomaly sign judging portion 55 transmits the machine control (stop of operation) to the machine operation request transmitting portion (C42).

The machine operation request transmitting portion 57 transmits the received machine control (stop of operation) to the machine operation controlling portion 8 of the die-casting machine 7 (C43).

The machine operation controlling portion 8 executes control of the die-casting machine 7 (stop of operation) based on the received machine control (stop of operation).

The second record describes a rule to stop the die-casting machine 7 before a defective product due to a mold temperature anomaly is manufactured, because a sign that a normal state is going to turn into an anomalous state has been detected.

Therefore, when detecting a sign of a temperature anomaly under which a defective product will be manufactured N shots ahead, the mold temperature anomaly sign judging portion 55 causes the die-casting machine 7 to stop at a time point N shots before the defective product is manufactured.

As described above, the machine operation request transmitting portion 57 constitutes the information outputting portion configured to output predetermined information when occurrence of a sign of a mold temperature anomaly is detected. The machine operation request transmitting portion 57 transmits a signal to request the die-casting machine 7, which is a manufacturing apparatus that manufactures a product using a mold, to control an operation to the connected die-casting machine 7. Especially, when the mold temperature anomaly degree inferring portion 54 detects occurrence of a sign of a mold temperature anomaly, the machine operation request transmitting portion 57 transmits a request signal to cause the die-casting machine 7 to stop, to the die-casting machine 7.

By the die-casting machine 7 being stopped, the mold temperature does not increase anymore and starts to decrease.

As described above, by the color of the warning lamp 5 changing from blue to yellow (or red), an administrator of the die-casting machine 7 can know occurrence of a sign of a heat pool.

Furthermore, since the die-casting machine 7 stops, it is possible to find a sign of a heat pool before a defect occurs due to a mold temperature anomaly, for example, because of uneven spray of a mold lubricant.

Especially, if casting is continued while the mold has a heat pool, remains of aluminum or the like are left in the mold. Therefore, the die-casting machine 7 is stopped, and cleaning of the mold is performed. Therefore, a down time period occurs. However, since it is possible to find a heat pool before a defective product occurs, as described above, casting is not continued, and cleaning of the mold can be avoided. As a result, it is also possible to reduce the down time period.

4) Process from Judgment of Normal Mold Temperature to Re-Operation of Die-Casting Machine Next, a process from judgment of a normal mold temperature to re-operation of the die-casting machine will be described.

Even if the die-casting machine 7 stops, thermography data of the thermography 4 is collected by the thermography data collecting portion 60 at predetermined intervals. The predetermined interval is the same or substantially the same as a data collection cycle when the die-casting machine 7 is operating.

The mold temperature decreases by the die-casting machine 7 being stopped. When the mold temperature becomes a predetermined normal temperature, the die-casting machine 7 resumes operation.

Figure 18:
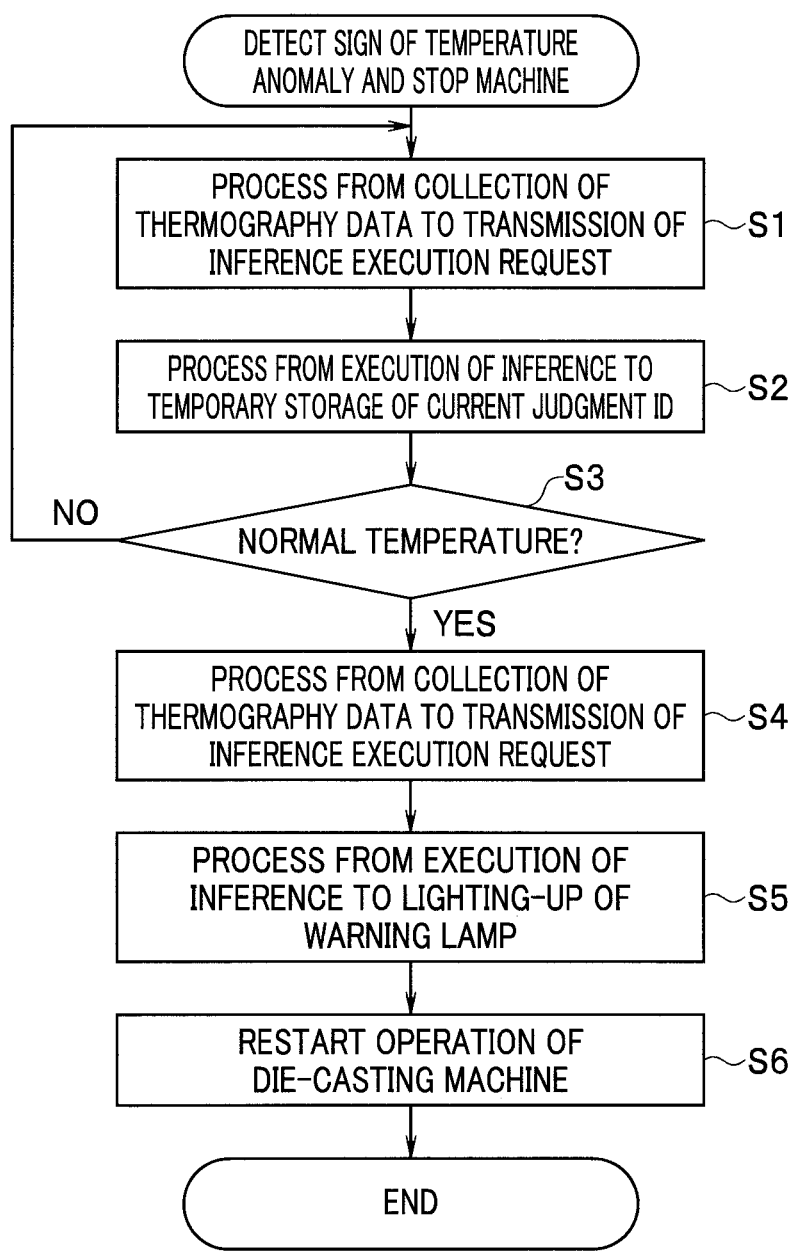
FIG. 18 is a flowchart showing an example of a flow of a process from judgment of normality of a mold temperature to re-operation of the die-casting machine according to the embodiment.

FIG. 18 is a flowchart showing an example of a flow of the process from judgment of a normal mold temperature to re-operation of the die-casting machine. The process of FIG. 18 is performed under control of the controlling portion 41.

When the mold temperature anomaly sign judging portion 55 detects a sign of a mold temperature anomaly, and the die-casting machine 7 stops, the process from collection of thermography data to transmission of an inference execution request is executed (step (hereinafter abbreviated as S) 1). The process of S1 corresponds to the process from C12 to C16 described above.

Next, the mold temperature anomaly degree inferring portion 54 executes the inference based on an inference model described above, and the mold temperature anomaly sign judging portion 55 makes an anomaly sign judgment and executes a process to temporary storage of the current judgment ID (S2). The process of S2 corresponds to the process from C22 to C29 described above.

Then, the mold temperature anomaly sign judging portion 55 judges whether the mold temperature has become a normal temperature or not (S3).

If the anomaly degree is a value within a predetermined value range, in the above example, a value between 0.0 and 0.6, including 0.0 and excluding 0.6, it is judged that the mold temperature has become a normal temperature. If the anomaly degree is not within the predetermined value range, however, the mold temperature does not become a normal temperature, and the process returns to S1. In other words, the processes of S1 and S2 are repeated until the mold temperature recovers to a normal temperature.

If the anomaly degree is a value within a predetermined value range, in the above example, a value between 0.0 and 0.6, including 0.0 and excluding 0.6, it is assumed that the mold temperature has become a normal temperature, and the process from collection of thermography data to transmission of an inference execution request is executed (S4). The process of S4 is the same as the process of S1. In other words, it is assumed that the mold has recovered to a normal temperature, and C12 to C16 described above is executed.

After the process of S4, the mold temperature anomaly sign judging portion 55 executes the process from execution of inference to lighting-up of the warning lamp (S5). The process of S5 corresponds to the process from C21 to C31 described above.

At S5, the mold temperature anomaly sign judging portion 55 executes anomaly sign judgment using the acquired anomaly sign judgment rules and the anomaly degree. For example, when it is assumed that the anomaly degree is 0.3, the anomaly degree corresponds to "JudgeRule01" based on the judgment rules of FIG. 12, and a control signal to change the color of the warning lamp 5 to blue is outputted based on the judgment ID, "JudgeRule01".

The mold temperature anomaly sign judging portion 55 acquires the preceding judgment ID from the preceding judgment temporary storing portion 55a. Since a judgment result at the time of the preceding casting is a warning (yellow), "JudgeRule02" stored before detection of the sign is acquired.

Note that the mold temperature anomaly sign judging portion 55 registers the current judgment ID, "JudgeRule01" with the preceding judgment temporary storing portion 55a.

The mold temperature anomaly sign judging portion 55 transmits a warning lamp lighting-up request to the warning lamp request transmitting portion 56 to cause the warning lamp 5 to light up in blue. The warning lamp 5 accepts the instruction to light up in blue and lights up in blue.

Next, the mold temperature anomaly sign judging portion 55 executes an operation restarting process for re-operating the connected die-casting machine which is being stopped (S6).

More specifically, the mold temperature anomaly sign judging portion 55 acquires the machine control rules from the machine control rule storing portion 52.

The mold temperature anomaly sign judging portion 55 finds a record of a matching rule based on the preceding judgment ID ("JudgeRule02") acquired at S4 described above and the current judgment ID ("JudgeRule01"). In FIG. 11, the third record matches, and "restart of operation" is selected as machine control. The mold temperature anomaly sign judging portion 55 transmits the machine control (restart of operation) to the machine operation request transmitting portion 57.

The machine operation request transmitting portion 57 transmits the received machine control (restart of operation) to the machine operation controlling portion 8 of the die-casting machine 7. The machine operation controlling portion 8 restarts operation of the die-casting machine 7 based on the received machine control (restart of operation).

In other words, when the mold temperature anomaly degree inferring portion 54 does not detect occurrence of a sign of a mold temperature anomaly after the machine operation request transmitting portion 57 transmits the request signal to cause the die-casting machine 7 to stop to the die-casting machine 7, the machine operation request transmitting portion 57 transmits a request signal to cause the die-casting machine 7 to resume operation, to the die-casting machine 7.

As described above, when a sign of a mold temperature anomaly is detected, the administrator is notified of the sign of the mold temperature anomaly by change in the color of the warning lamp 5.

By seeing a thermo image and spraying a mold lubricant to a high-temperature part on the surface of the mold, the administrator can take appropriate measures such as decreasing of the surface temperature of the mold.

Furthermore, when a sign of a mold temperature anomaly is detected, the die-casting machine 7 stops operation based on the machine control rules, so that occurrence of a defective product is prevented.

Then, the mold temperature returns to a normal temperature after the die-casting machine stops once, the die-casting machine 7 automatically resumes operation.

Therefore, occurrence of a defective product is automatically prevented, and a site administrator does not have to manage restart of operation of the die-casting machine 7 because it is not necessary to manually restart the operation of the die-casting machine 7.

5) Visualization Process of Gradient Data in Attention Area at the Time of Inference A thermo image of the mold can be displayed on the monitor 6. However, when there is a temperature anomaly, a state of a temperature anomaly may be displayed on the monitor 6 based on a generated inference model.

In a thermo image, heat distribution is displayed with colors. However, it is difficult for the user to judge which heat distribution causes a defective product to easily occur or in which heat distribution a defective product does not occur unless the user is a skilled site expert.

Therefore, in the present embodiment, an image in which the gradient data of an inference model described above is visualized is generated and superimposed on a thermo image.

Figure 19:
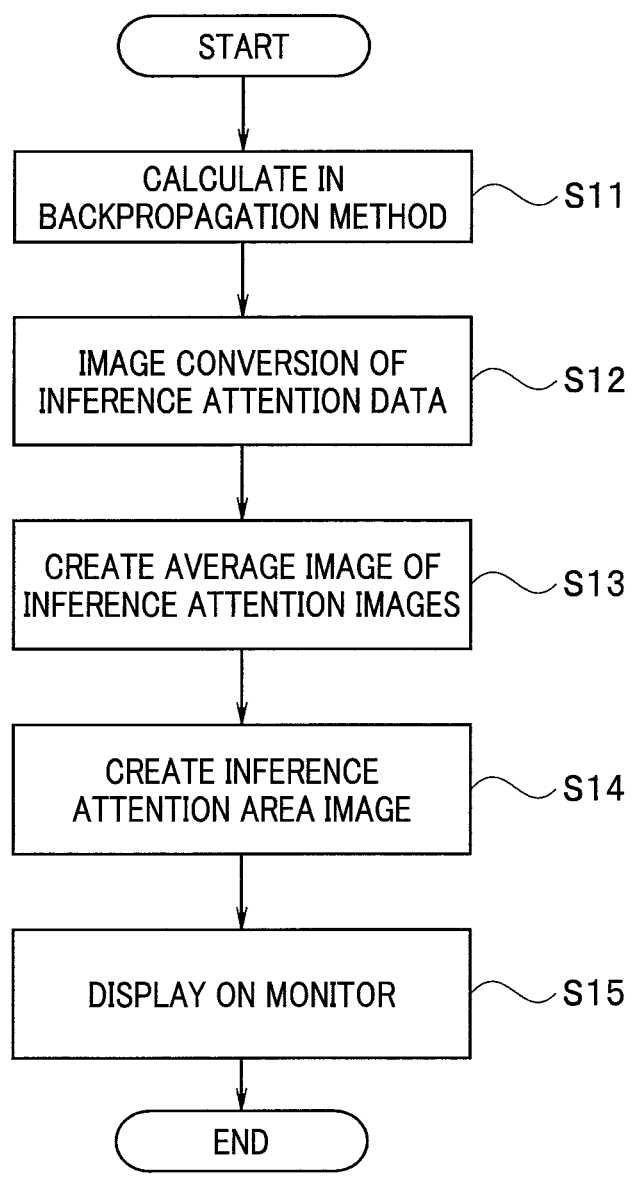
FIG. 19 is a flowchart showing an example of a flow of a gradient data visualization process according to the embodiment.

FIG. 19 is a flowchart showing an example of a flow of a gradient data visualization process.

When the user such as a site administrator gives a predetermined instruction from an input/output I/F (not shown) to the mold temperature automatic control apparatus 3, the controlling portion 41 executes the process of FIG. 19.

First, the inference attention area visualization processing portion 58 executes a backpropagation method, with preprocessed data corresponding to N images as an input, and outputs an inference attention data set for the input (S11). For the backpropagation method, see "Learning representations by back-propagating errors" by Rumelhart, David E.; Hinton, Geoffrey E., Williams, Ronald J., Oct. 8, 1986, Nature 323 (6088).

A backpropagation process is executed according to an inference model set beforehand.

The inference attention data set is a matrix obtained by calculating gradient vectors for all the preprocessed data set corresponding to N images by the backpropagation method and arranging the calculated gradient vectors.

Here, partial derivative values constituting a gradient vector can be calculated using a chain rule or the like. The chain rule is a relational expression that, when a composite function obtained by combining a plurality of functions is differentiated, a derived function of the composite function is given as a product of respective derived functions.

Figures 20, 21:
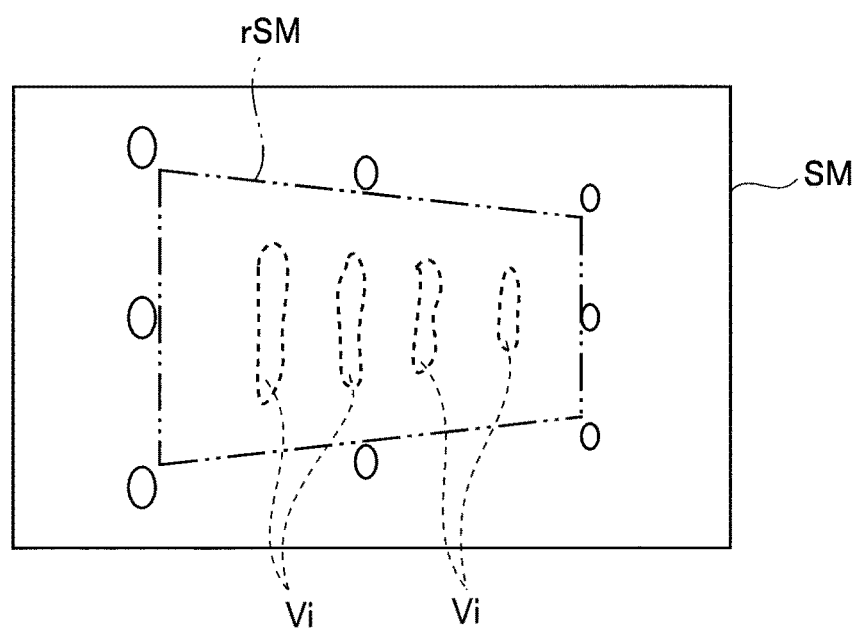
FIG. 20 is a diagram showing an example of an inference attention data set according to the embodiment.
FIG. 21 is a diagram showing a display example of visualized gradient data to be displayed on a monitor 6 according to the embodiment.

FIG. 20 is a diagram showing an example of the inference attention data set. An example of a case where the number of input variables is n (the number of vertical pixels (m) of an image×the number of horizontal pixels (k)×the number of images (N)) is shown. A gradient vector of each row of the inference attention data set which is indicated by a dotted line includes partial derivative values calculated from a thermo image data set for each casting.

More specifically, the first row shows a gradient vector at the time of K-th casting; the second row shows a gradient vector at the time of (K+1)th casting; the third row shows a gradient vector at the time of (K+2)th casting; and the L-th row shows a gradient vector at the time of (K+L)th casting.

When the user specifies preprocessed data corresponding to N images for the visualization process, an inference attention data set corresponding to N images is selected from among data as shown in FIG. 20.

The inference attention area visualization processing portion 58 executes a process for converting values of each gradient vector of the inference attention data set to pixel values and outputs the pixel values as inference attention image data (S12). In other words, each gradient vector of the inference attention data set is normalized to absolute values between 0 to 255 including 0 and 255 and converted to image data.

The inference attention area visualization processing portion 58 creates inference attention area average image data from the inference attention data set corresponding to N images (S13).

For each piece of data, the inference attention area visualization processing portion 58 outputs inference attention area image data obtained by combining N thermo images of thermo image data corresponding to the preprocessed data and an average image of average image data created at S13 (S14). In the example described above, data of an inference attention area image obtained by superimposing three thermo images and the average image on each other.

Note that N may be 1, and, in that case, one thermo image and the images converted at S12 are combined.

The inference attention area visualization processing portion 58 supplies the inference attention area image data to the mold temperature monitor display processing portion 59, and visualized gradient data and a thermo image are superimposedly displayed on a screen of the monitor 6 (S15).

Therefore, it can be said that the visualized gradient data shows error distribution for each area on the thermo image.

As described above, the inference attention area visualization processing portion 58 and the mold temperature monitor display processing portion 59 constitute a visualization processing portion configured to perform a process for visualizing gradient vectors of a specified thermo image about a predetermined parameter of each layer of an inference model to display the gradient vectors on the monitor 6.

FIG. 21 is a diagram showing a display example of the visualized gradient data displayed on the monitor 6.

In FIG. 21, areas Vi indicated by dotted lines are images obtained by converting gradient vectors to images for respective areas on a thermo image (hereinafter referred to as gradient vector images). Therefore, the user can intuitively know a temperature state of the mold from a state of a pattern of the gradient vector images superimposed on the thermo image.

Therefore, since it is possible to compare many gradient vector images at anomalous time and many gradient vector images at normal time displayed on the monitor 6, the user can make a judgment, a prediction and the like about whether a mold temperature is normal or anomalous by seeing the gradient vector images.

Further, the user can also expect to give feedback to mold design from the gradient vector images at anomalous time.

As described above, for example, a mold lubricant may be unevenly sprayed each time, and, therefore, a heat pool spot does not always occur at the same place. Therefore, there is a problem that it is not easy to take pinpoint cooling measures by spray of a mold lubricant. However, by estimating and visualizing a spot of a sign of a heat pool as described above, the user can judge the spot where the sign of a heat pool is detected, by eyes, and, therefore, pinpoint spray of a mold lubricant becomes possible. Cooling of the mold is accelerated, and it is expected that the number of defects further decreases.

Conventionally, since thermography image analysis by an expert is a personal method, it cannot be applied to many factories and many products.

However, according to the embodiment described above, it is possible to automatically detect a sign of occurrence of a heat pool from time-series data (thermo images) of a mold similarly to a conventional site expert.

Furthermore, it is possible to realize automatic control to temporarily stop a die-casting machine until a mold returns to a normal temperature after detection of a sign of a heat pool and then restart the die-casting machine.

Further, it is also possible to estimate and visualize a spot of a sign of a heat pool.

As described above, according to the present embodiment, it is possible to provide a mold temperature anomaly sign detection apparatus capable of detecting a sign of a mold temperature anomaly from thermography images, a mold temperature anomaly sign detection method and a storage medium.

Note that though an example in which the mold is a mold used for the die-casting machine 7 has been described in the embodiment described above, the embodiment described above is also applicable to a mold used for an injection molding machine.

Note that the whole or a part of a program to execute the operations described above is recorded or stored in a portable medium such as a flexible disk and a CD-ROM or a storage medium such as a hard disk, as a computer program product. By the program being read by a computer, all or a part of the operations are executed. The whole or a part of the program can be distributed or provided via a communication network. A user can easily realize the mold temperature anomaly sign detection apparatus described above by downloading the program via the communication network and installing the program into a computer or by installing the program into the computer from a recording medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mold temperature anomaly sign detection apparatus, comprising:
    a model generating portion configured to, based on a plurality of pieces of thermo image data of a mold acquired at predetermined intervals and pieces of teaching data associated with the plurality of pieces of thermo image data, learn a predetermined number of consecutive pieces of time-series image data extracted from the plurality of pieces of thermo image data as one piece of sample data to generate an inference model for detecting a sign of a temperature anomaly of the mold;
    an inference executing portion configured to detect occurrence of the sign of the temperature anomaly of the mold after the predetermined number of consecutive pieces of time-series image data have elapsed from a certain timing using the inference model, based on the predetermined number of pieces of time-series image data of the mold at the certain timing before; and
    an information outputting portion configured to output predetermined information when the inference executing portion detects the occurrence of the sign of the temperature anomaly of the mold.

2. The mold temperature anomaly sign detection apparatus according to claim 1, wherein
    the model generating portion performs generation of the inference model by learning by deep learning.

3. The mold temperature anomaly sign detection apparatus according to claim 1, wherein
    the information outputting portion outputs the predetermined information to a notifying portion configured to notify the occurrence of the sign of the temperature anomaly.

4. The mold temperature anomaly sign detection apparatus according to claim 3, wherein
    the notifying portion is a warning lamp; and
    the information outputting portion is a request transmitting portion configured to give the warning lamp a lighting-up instruction to light up in a predetermined color.

5. The mold temperature anomaly sign detection apparatus according to claim 1, wherein
    the information outputting portion is a request transmitting portion configured to transmit a signal to request operation control from a manufacturing apparatus configured to manufacture a product using the mold, to the manufacturing apparatus.

6. The mold temperature anomaly sign detection apparatus according to claim 5, wherein
    when the inference executing portion detects the occurrence of the sign of the temperature anomaly of the mold, the request transmitting portion transmits a request signal to cause the manufacturing apparatus to stop, to the manufacturing apparatus.

7. The mold temperature anomaly sign detection apparatus according to claim 6, wherein
    when the inference executing portion does not detect occurrence of the sign of the temperature anomaly of the mold after transmitting the request signal to cause the manufacturing apparatus to stop, to the manufacturing apparatus, the request transmitting portion transmits a request signal to cause the manufacturing apparatus to resume operation, to the manufacturing apparatus.

8. The mold temperature anomaly sign detection apparatus according to claim 1, wherein
    the inference model is a neural network type inference model including an input layer, a hidden layer and an output layer; and
    the mold temperature anomaly sign detection apparatus comprises a visualization processing portion configured to perform a process for visualizing a gradient vector of a specified thermo image about a predetermined parameter of each layer of the inference model to display the gradient vector on a monitor.

9. A computer-readable non-transitory storage medium in which a program is recorded, the program comprising:
    a code for, based on a plurality of pieces of thermo image data of a mold acquired at predetermined intervals and pieces of teaching data associated with the plurality of pieces of thermo image data, learning a predetermined number of consecutive pieces of time-series image data extracted from the plurality of pieces of thermo image data as one piece of sample data to generate an inference model for detecting a sign of a temperature anomaly of the mold;
    a code for detecting occurrence of the sign of the temperature anomaly of the mold after the predetermined number of consecutive pieces of time-series image data have elapsed from a certain timing using the inference model, based on the predetermined number of pieces of time-series image data of the mold at the certain timing before; and
    a code for outputting predetermined information when the occurrence of the sign of the temperature anomaly of the mold is detected.

10. A mold temperature anomaly sign detection method comprising:
    learning, based on a plurality of pieces of thermo image data of a mold acquired at predetermined intervals and pieces of teaching data associated with the plurality of pieces of thermo image data, a predetermined number of consecutive pieces of time-series image data extracted from the plurality of pieces of thermo image data as one piece of sample data and generating an inference model for detecting a sign of a temperature anomaly of the mold; and
    detecting occurrence of the sign of the temperature anomaly of the mold after the predetermined number of consecutive pieces of time-series image data have elapsed from a certain timing using the inference model based on the predetermined number of pieces of time-series image data of the mold at the certain timing before, and outputting predetermined information when the occurrence of the sign of the temperature anomaly of the mold is detected.

\* \* \* \* \*